(12) United States Patent
Iacobelli et al.

(10) Patent No.: US 11,929,065 B2
(45) Date of Patent: Mar. 12, 2024

(54) COORDINATING ELECTRONIC PERSONAL ASSISTANTS

(71) Applicant: Cerence Operating Company, Burlington, MA (US)

(72) Inventors: Giuseppe Iacobelli, Montreal (CA); Binh Nguyen, Montreal (CA); Josef Anastasiadis, Aachen (DE)

(73) Assignee: Cerence Operating Company, Burlington, MA (US)

( * ) Notice: Subject to any disclaimer, the term of this patent is extended or adjusted under 35 U.S.C. 154(b) by 204 days.

(21) Appl. No.: 17/490,367

(22) Filed: Sep. 30, 2021

(65) Prior Publication Data

US 2022/0036886 A1 Feb. 3, 2022

Related U.S. Application Data

(63) Continuation of application No. 17/082,632, filed on Oct. 28, 2020, now Pat. No. 11,189,271.

(60) Provisional application No. 62/977,464, filed on Feb. 17, 2020.

(51) Int. Cl.
*G10L 15/00* (2013.01)
*G10L 15/183* (2013.01)
*G10L 15/22* (2006.01)
*G10L 15/30* (2013.01)
*G10L 15/08* (2006.01)
*G10L 15/18* (2013.01)

(52) U.S. Cl.
CPC ............ *G10L 15/183* (2013.01); *G10L 15/22* (2013.01); *G10L 15/30* (2013.01); *G10L 15/08* (2013.01); *G10L 15/1822* (2013.01)

(58) Field of Classification Search
CPC ......... G10L 15/07; G10L 15/20; G10L 15/22; G10L 15/30; G10L 15/26; G10L 15/02; G10L 15/063; G10L 15/08; G10L 15/1822; G10L 15/183; G10L 15/19; G10L 15/193; G10L 25/78; G10L 25/87; G10L 15/14; G10L 15/197; G10L 15/1815
See application file for complete search history.

(56) References Cited

U.S. PATENT DOCUMENTS

| | | | |
|---|---|---|---|
| 7,460,995 B2 | 12/2008 | Rinscheid | |
| 7,716,050 B2 | 5/2010 | Gillick et al. | |
| 8,527,271 B2 | 9/2013 | Wandinger et al. | |
| 8,938,688 B2 | 1/2015 | Bradford et al. | |
| 9,448,993 B1 | 9/2016 | Braga et al. | |
| 9,626,355 B2 | 4/2017 | Bradford et al. | |
| 9,805,722 B2 | 10/2017 | Konig et al. | |
| 10,217,453 B2 | 2/2019 | Stevans et al. | |
| 10,762,900 B2 * | 9/2020 | Ben-Dor | H04L 41/0893 |

(Continued)

FOREIGN PATENT DOCUMENTS

WO 2016/0857761 A1 6/2016

*Primary Examiner* — Vu B Hang
(74) *Attorney, Agent, or Firm* — Occhiuti & Rohlicek LLP

(57) ABSTRACT

A method includes receiving a representation of a spoken utterance, processing the representation of the spoken utterance to identify, from a number of candidate domains, a request and a serving domain, and routing the request to a personal assistant based on the request and the serving domain. Identification of the serving domain is based on one or more of a contextual state, a behavior profile of a speaker of the utterance, and a semantic content of the utterance.

20 Claims, 3 Drawing Sheets

(56) References Cited

U.S. PATENT DOCUMENTS

| | | |
|---|---|---|
| 10,783,872 B2 | 9/2020 | Almudafar-Depeyrot et al. |
| 11,037,562 B2 * | 6/2021 | Shah ................. G06F 3/167 |
| 11,164,570 B2 * | 11/2021 | Nadkar ............... G06F 3/167 |
| 11,183,183 B2 * | 11/2021 | Myers ................ G06F 3/167 |
| 11,579,749 B2 * | 2/2023 | Ni ..................... G06F 3/0484 |
| 11,631,017 B2 * | 4/2023 | White ................. G06N 5/043 |
| | | 706/49 |
| 2003/0167167 A1 | 9/2003 | Gong |
| 2013/0072169 A1 | 3/2013 | Ross et al. |
| 2020/0183815 A1 | 6/2020 | Mont-Reynaud et al. |
| 2020/0410983 A1 | 12/2020 | Mohajer et al. |

* cited by examiner

COORDINATING ELECTRONIC PERSONAL ASSISTANTS

CROSS-REFERENCES TO RELATED APPLICATIONS

This application is a continuation of U.S. application Ser. No. 17/082,632, filed on Oct. 28, 2020, which claims the benefit of U.S. Provisional Application No. 62/977,464 filed Feb. 17, 2020, the contents of which are incorporated herein.

BACKGROUND OF THE INVENTION

This invention relates to coordinating electronic personal assistants.

An electronic personal assistant includes software running on a device (or in the cloud) that performs tasks for users. These tasks often require a data connection between the personal assistant and another resource, such as a "smart" device or a third-party resource via a local network, a wide-area network (such as the internet), or through some other means. Examples of personal assistants include SIRI (running on, e.g., an APPLE computing device), ALEXA (running on, e.g., an AMAZON ECHO), BIXBY (running on, e.g., a SAMSUNG mobile device), among many others. Personal assistants are implemented on a variety of hardware, including mobile devices such as mobile phones, tablets, and smart watches; stationary devices such as smart speakers or personal computers; or in vehicles such as cars.

Personal assistants often accept voice input. To help distinguish a spoken utterance meant to invoke the assistant from an utterance not meant to do so, virtual assistants often have "wake words." Generally speaking, when a virtual assistant detects a wake word (such as "hey Siri" or "Alexa"), the virtual assistant attempts to interpret the speech that follows the wake word as a request by the user to perform some specified function. To mitigate the risk of accidentally triggering a virtual assistant, or triggering the wrong virtual assistant, wake words tend to be distinctive words or phrases. Thus, users of several different personal assistants must remember and use several different wake words.

Personal assistants are proliferating, with personal assistant technology being incorporated into more and more hardware platforms. Moreover, personal assistant technology can schedule, operate, or otherwise control yet more devices—so-called "connected" or "smart" devices—including but not limited to light bulbs, door locks, garage doors, faucets and showers, cleaning appliances, cooking appliances, security systems, and others.

SUMMARY OF THE INVENTION

The proliferation of connected devices and personal assistants raises some challenges. One such challenge, from the perspective of a user, is that some smart devices are incompatible with some personal assistants. One solution employed by some people is simply to use several personal assistants. But this raises another challenge: a person may need to remember which devices are compatible with which personal assistant, which can sometimes be difficult. Moreover, in some circumstances a person may not have direct access to a given personal assistant. For example, a person may have convenient access to a personal assistant that is only implemented on hardware that resides in the person's home. Thus, for example, a person may not be able to interact with all their personal assistants while in a car.

Another challenge, from the perspective of manufacturers such as vehicle manufacturers (or other original equipment manufacturers ("OEMs")) is that their specific equipment may not be well-suited to any existing personal assistant. However, it may simultaneously be difficult or infeasible to create a completely new personal assistant that is both (a) well-suited to the OEM's particular equipment, and (b) well-suited to other functionality unrelated to the equipment.

For example, one category of OEM that may face this challenge includes vehicle manufacturers. A typical vehicle may include a variety of functionality that is amenable to voice control by a personal assistant. Such functionality includes but is not limited to controlling musical or other audio output, making or receiving phone calls, controlling environmental settings, or presenting information on an in-vehicle display, such as navigation information (e.g., speed, direction, time to destination, location of the vehicle on a map, etc.), vehicle status information (e.g., maintenance status; fuel, battery, or fluid levels), or any information of interest to a driver or passenger at a particular moment (e.g., what song is at the top of the charts this week?). Thus, a vehicle manufacturer may spend a great deal of time or effort developing how an in-vehicle personal assistant controls functionality of the vehicle itself, the vehicle manufacturer may not necessarily develop capabilities of the personal assistant that do not involve the vehicle itself, such as identifying hit songs.

This phenomenon, when experienced by several OEMs over several equipment categories, can lead to a fractured personal assistant environment in which a user may experience difficulty remembering the details of which personal assistant best executes desired functionality. In this fractured environment, a user wishing to execute a task via a personal assistant much (a) decide in advance which personal assistant is best suited to the task; (b) invoke that specific personal assistant with the appropriate wake word; and (c) issue the appropriate command to execute the task.

Aspects described herein mitigate these challenges faced by personal assistant users and OEMs by creating a platform capable of routing user requests to appropriate personal assistants and/or smart devices that work in combination with personal assistants. Aspects are operable to "arbitrate" an invocation of a personal assistant's functionality. That is, aspects analyze an input request from a user as described more fully below, and based on the analysis are operable to route the input (or information derived from the input) to a personal assistant that is predicted to best carry out the user's request. Thus, the user is spared the requirement to remember (or even decide) which personal assistant is best suited for a certain task. Similarly, OEMs are incentivized to control aspects of equipment-specific personal assistants, without burdening a user to have yet another personal assistant to directly interact with.

In a general aspect, a method includes receiving a representation of a spoken utterance, processing the representation of the spoken utterance to identify, from a number of candidate domains, a request and a serving domain, and routing the request to a personal assistant based on the request and the serving domain. Identification of the serving domain is based on one or more of a contextual state, a behavior profile of a speaker of the utterance, and a semantic content of the utterance.

Aspects may include one or more of the following features.

The contextual state may include a location of the speaker. The contextual state may include a time of day. The contextual state may include a current weather condition. The contextual state may include calendar information of the speaker.

The method may further include identifying a number of candidate personal assistants based on the request and the serving domain and computing a match score of the request and each candidate personal assistant, in which the request is routed to the personal assistant having the maximum match score from among the candidates. A match score of a particular personal assistant may be reduced if routing the request to the particular personal assistant would result in a pre-determined dangerous condition. A match score of a particular personal assistant may be reduced if routing the request to the particular personal assistant would result in no action. One of the candidate personal assistants may be operable to control functionality of a vehicle.

In another general aspect, a system includes an input for receiving a representation of a spoken utterance, one or more processors for processing the representation of the spoken utterance to identify, from a number of candidate domains, a request and a serving domain based on one or more of a contextual state, a behavior profile of a speaker of the utterance, and a semantic content of the utterance, and an output for providing the request to one of a number of personal assistants based on the request and the serving domain.

In another general aspect, a method for managing interactions between users of an interface and a number of voice assistants associated with the interface includes receiving a voice command from a user of the interface, determining a voice assistant of the number of voice assistants for servicing the command, and providing a representation of the voice command to the voice assistant for servicing.

Aspects may include one or more of the following features.

The method may include monitoring an interaction between the voice assistant and the user during servicing of the command. The monitoring may include determining when the voice assistant has finished servicing the command. The monitoring may include processing the interaction between the voice assistant and the user according to a user interaction model. Determining the voice assistant for servicing the command may include processing the voice command according to a user interaction model. At least one voice assistant of the number of voice assistants may be native to the interface and at least one voice assistant of the number of voice assistants may be non-native to the interface. The interface may be an in-vehicle interface. At least one of the voice assistants may be associated with a smartphone or a smart speaker.

In another general aspect, a system for managing interactions between users of an interface and a number of voice assistants associated with the interface includes an input for receiving a voice command from a user of the interface, an arbitration module for determining a voice assistant of the number of voice assistants for servicing the command, and an output for providing a representation of the voice command to the voice assistant for servicing.

In another general aspect, software stored on a non-transitory computer readable medium, includes instructions for causing one or more processors to perform a method for managing interactions between users of an interface and a number of voice assistants associated with the interface. The software includes instructions for causing the one or more processors to receive a voice command from a user of the interface, determine a voice assistant of the number of voice assistants for servicing the command, and provide a representation of the voice command to the voice assistant for servicing.

Among other advantages, aspects described herein allow native, in-vehicle interfaces to co-exist with third-party voice assistants. Aspects minimize dead ends by seamlessly interacting with third-party voice assistants.

Aspects provide a single interface that is used to access multiple different domains (e.g., vehicle-specific domains, phone-specific domains, productivity-specific domains, smart-home specific domains, and so on).

Other features and advantages of the invention are apparent from the following description, and from the claims.

DETAILED DESCRIPTION

1. Overview

Figure 1:
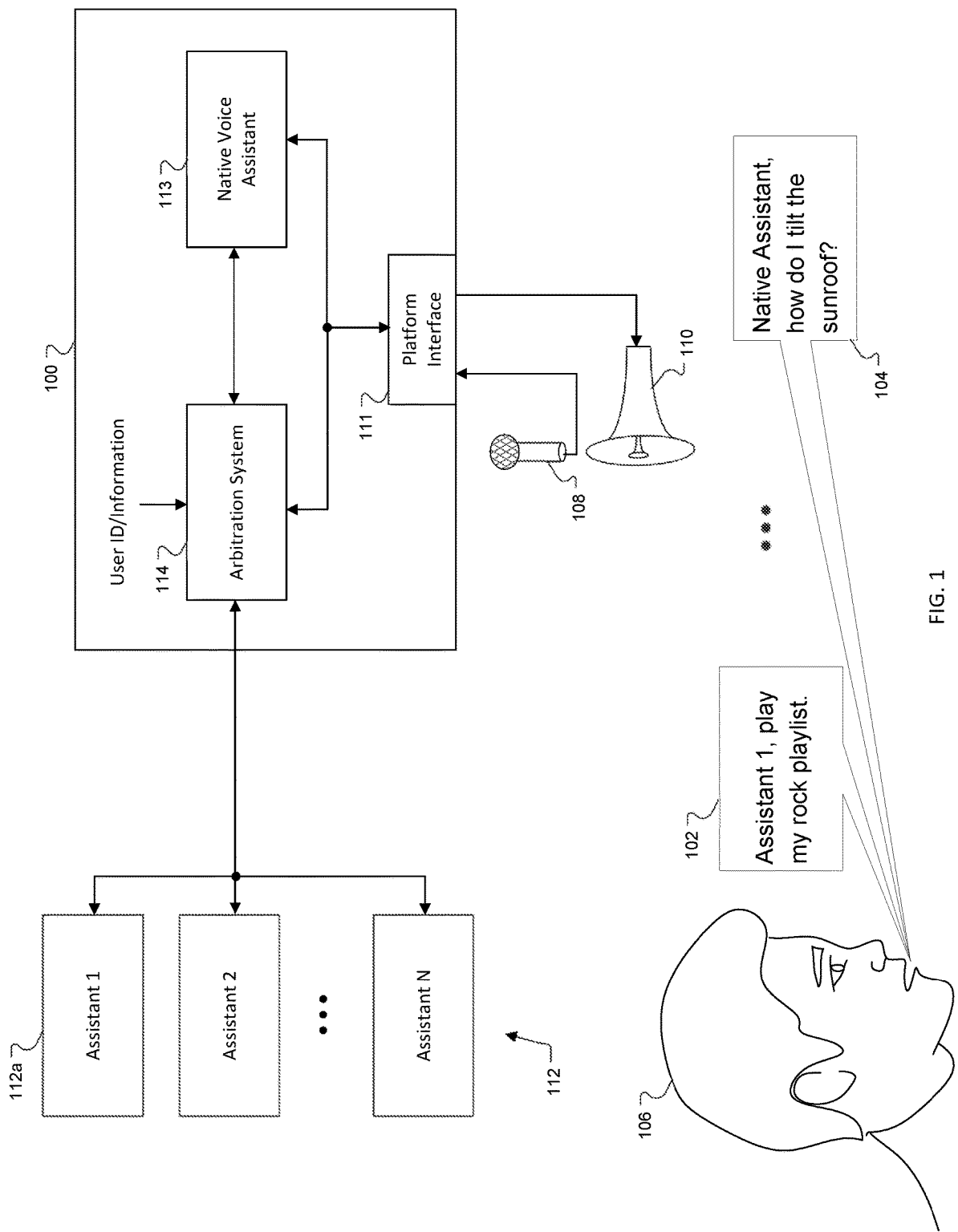
FIG. 1 is a platform including an arbitration system.

Referring to FIG. 1, a platform 100 (e.g., an infotainment system) in a vehicle (not shown) is configured to interact with a user 106 using one or more microphones 108 and one or more loudspeakers 110. In one form of interaction, the platform 100 receives voice commands 102, 104 from the user 106 (e.g., the driver) at a platform interface 111 of the platform 100, where at least some of the voice commands 102, 104 are directed to one of a number of voice assistants 112, 113 associated with or included in the platform 100. As is described in greater detail below, the platform 100 is configured to arbitrate handling of the voice commands 102, 104 by the voice assistants 112, 133 in a way that preserves control of the platform 100 for the vehicle manufacturer while providing the user 106 access to their preferred voice assistants.

In FIG. 1, the platform 100 includes a native voice assistant 113 and an arbitration system 114 that are in communication using an internal control protocol (e.g., a virtual audio device that streams with delay or replays audio between the native voice assistant 113 and the arbitrations system 114). The arbitration system 114 and the native voice assistant 113 both receive an audio stream from the microphone 108 (via the platform interface 111).

The arbitration system 114 monitors the audio stream to identify voice commands from the user 106 of the vehicle. When the user 106 speaks a command in the vehicle, the arbitration system 114 recognizes the command and processes it (e.g., using a natural language understanding model) to determine if it is directed to the native voice assistant 113 associated with the vehicle or to another, third-party voice assistant 112. In some examples, the arbitration system relies on wake words to determine which voice assistant should handle the voice command.

In the case that the command is directed to the native voice assistant 113, the arbitration system 114 notifies the native voice assistant 113 that it should handle the command. Given that the native voice assistant 113 also receives the audio stream, it processes the command from the audio stream and then notifies the arbitration system 114 that its processing is complete. The arbitration system 114 then resumes monitoring the audio stream to identify voice commands.

For example, when the user 106 speaks the voice command 104 "Native Assistant, how do I tilt the sunroof?," the arbitration system 114 identifies the voice command as being directed to the native voice assistant 113. The arbitration system 114 notifies the native voice assistant 113 that it should handle the command 104. The native voice assistant 113 processes the command (e.g., by providing instructions to the user 106 via the loudspeaker 110 or a touchscreen interface, not shown) and then notifies the arbitration system 114 that its processing is complete. The arbitration system 114 then resumes monitoring the audio stream to identify voice commands.

In the case that the voice command is directed to a third-party voice assistant 112, the arbitration system 114 first identifies which third-party voice assistant 112 the command is directed to (as is described in greater detail below) and then sends the voice command to the identified third-party voice assistant 112 (e.g., using an external control protocol, optionally including a common channel signaling protocol). With the arbitration system 114 monitoring the interaction, the identified third-party voice assistant 112 processes the command (e.g., by further interacting with the user and/or providing instructions to the user 106 via the loudspeaker 110). When the arbitration system 114 determines that the identified third-party voice assistant has finished processing the command (as is described in greater detail below), it resumes monitoring the audio stream to identify further voice commands.

For example, when the user 106 speaks the voice command 106 "Assistant 1, play my rock playlist," the arbitration system 114 identifies the voice command as being directed to voice assistant 1 112a. The arbitration system 114 then sends the voice command to voice assistant 1 112a using the external control protocol. The arbitration system 114 then monitors any interaction between voice assistant 1 112a and the user 106 that results from the voice command. In this example, the voice command is complete when voice assistant 1 112a begins playing the user's rock playlist from the loudspeaker 110. At that point, the arbitration system 114 determines that voice assistant 1 112a has finished processing the command and resumes monitoring the audio system to identify further commands.

2 Arbitration System

Very generally, the arbitration system 114 uses natural language processing techniques to identify voice commands that are directed to different voice assistants and to manage interactions between the user 106 and the various voice assistants 112, 113.

For example, the arbitration system 114 may implement a native user interaction model that characterizes interactions between the user 106 and the native voice assistant 113. The arbitration system may also incorporate a representation of specific user interaction models for the various third-party voice assistants 112 into the native user interaction model (where the combination is referred to as a "combined user interaction model").

In operation, the combined user interaction model is used by the arbitration system 114 to distinguish which voice commands are associated with which voice assistants 112, 113 based on, for example, speech/invocation patterns associated with the voice commands. In a simple example, the combined user interaction model would identify that the command "Native assistant, how do I tilt the sunroof" is directed to the native voice assistant 113 based on the mention of the native voice assistant in the voice command. Similarly, the combined user interaction model would identify that the command "Assistant 1, play my rock playlist" is directed to voice assistant 1 112a based on the mention of assistant 1 in the voice command.

But other more complex examples are possible as well. For example, the combined interaction model could identify the appropriate voice assistant based on the type of voice command without specific mention of the voice assistant in the command. For example, the voice command "how do I tilt the sunroof" would likely be directed to the native voice assistant, because the native voice assistant is most likely to know the answer. Similarly, if voice assistant 1 112a is the only voice assistant with music playback capabilities, the voice command "play my rock playlist" would be identified as being directed to voice assistant 1 112a.

The combined user interaction model is also used by the arbitration system 114 to monitor interactions between the voice assistants and the user 106 to determine when the interaction is complete. For example, the combined user interaction model characterizes the possible states of an interaction between the user 106 and the voice assistant to determine when the interaction has reached an end state. In a specific example, the user 106 may speak the voice command "Assistant 1, play music." At that point, the combined user interaction model would know that the interaction has begun but is not complete. The voice assistant would then respond, "which playlist?" and the combined user interaction mode would recognize that the interaction had progressed but is still not complete. Finally, the user would respond "my rock playlist" and the combined user interaction model would recognize that the interaction had reached its final state and is over. In this way, the combined user interaction model allows the arbitration system 114 to control interactions between the users and the voice assistants.

3 System Configuration

Figure 2:
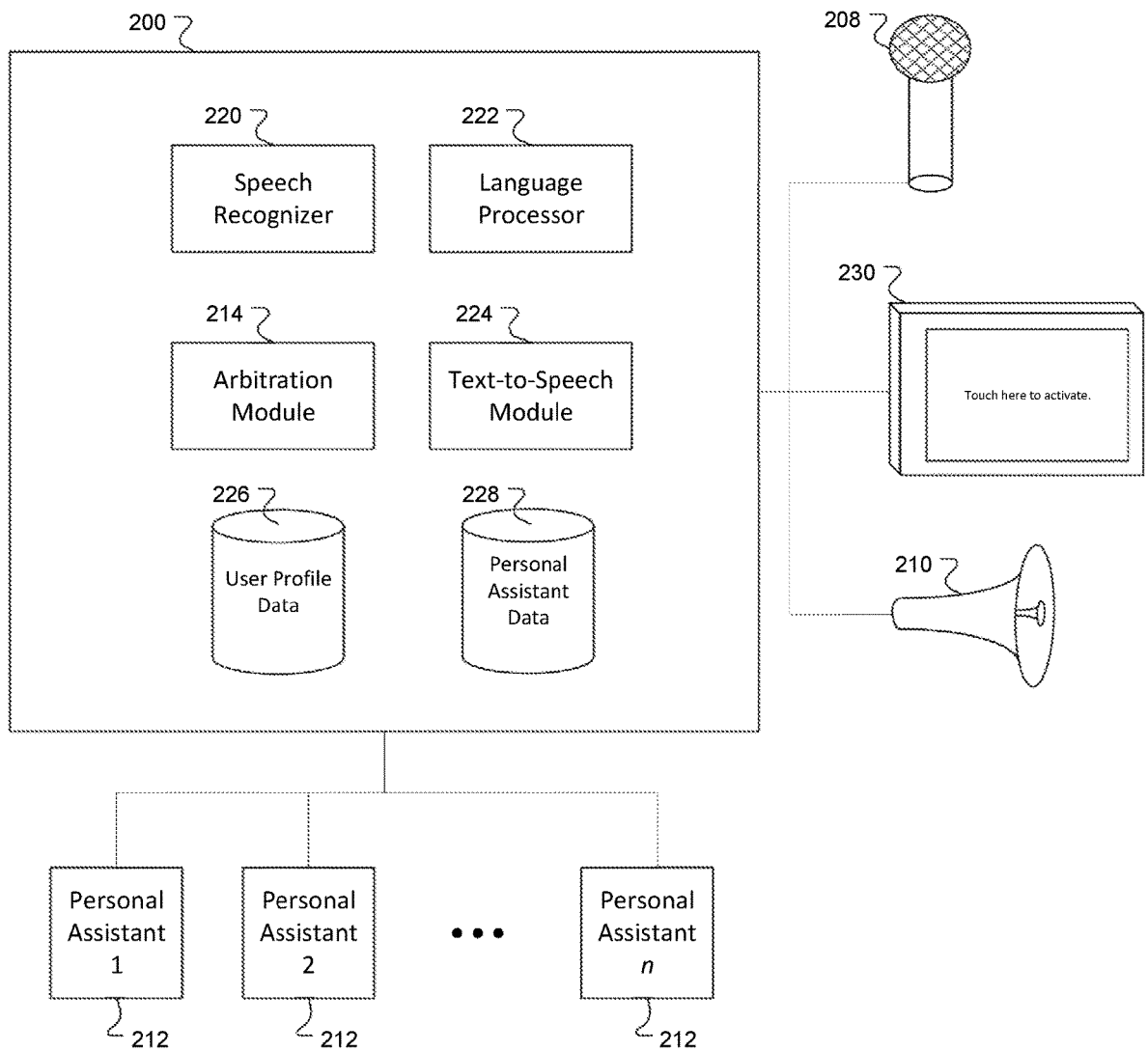
FIG. 2 is a system-level block diagram of the platform of FIG. 1.

FIG. 2 is a block diagram showing a general system configuration of the of in-vehicle platform described above. In some examples, the platform 200 includes a speech recognizer 220, a language processor 222, an arbitration module 214, and a text-to-speech module 224. The platform 200 may also include or be capable of accessing user profile data 226 and personal assistant data 228. The platform 200 may include various input/output devices, such as one or more microphones 208, one or more displays 230 (including touch-sensitive displays), or one or more loudspeakers 210. As described more fully below, the arbitration platform 200 is operable to receive an input, determine which (among many) personal assistants is best suited to handle the input, and route the input appropriately to that personal assistant for further processing.

The speech recognizer 220 is operable to receive a voice signal (e.g., from microphone 208 or from a remote source over a data connection) and convert a spoken utterance embodied in the voice signal to a text string. In some examples, the speech recognizer 220 can include the NUANCE SPEECH SERVER, or other automatic speech recognition software known in the art. Details of the automatic speech recognition software can be found in U.S. Pat. Nos. 8,527,271, 9,805,722, 7,460,995, 7,716,050, the contents of which are incorporated herein by reference.

In some examples, the speech recognizer 220 may operate with reference to certain user profile data 226. The user profile data 226 may include one or more voice models trained by one or more users of the platform 200. Such trained models may allow the speech recognizer 220 to more accurately recognize speech, especially for users with unusual or non-standard speaking patterns.

The language processor 222 is operable to accept a text string that represents an utterance spoken in natural language, and determine semantic content of an utterance, or a domain and/or an intent invoked by the utterance, as described more fully below (see FIG. 3). In some examples, the language processor 222 accepts its input from the output of the speech recognizer 220. In some examples, the language processor can include the NUANCE NATURAL LANGUAGE UNDERSTANDING platform, details of which can be found U.S. Pat. Nos. 9,448,993, 8,938,688, and 9,626,355, the contents of which are incorporated herein by reference.

Generally speaking, a domain (or for a request, a "serving domain") refers to a broad category of possible actions or information that a spoken request pertains to, and an intent refers to what specific actions a request involves, in the context of the domain. For example, for the spoken request "play Mozart," the relevant serving domain may relate to music, with the more specific intent of playing music by the artist Mozart. Note that the full semantic content of a request is sometimes required to best identify a domain. For example, from the word "play" alone, a serving domain involving playing games may also potentially be invoked. However, if the game-playing domain had no intent corresponding to the word "Mozart," then the game-playing domain would not be relevant to this request. On the other hand, if one of the user's personal assistants included a game called "Mozart," then further information may be required to resolve the ambiguity. This is discussed in more detail below.

Certain intents may also require additional information. For example, the request "schedule a one hour meeting with Bob at 3:00 pm tomorrow" may invoke a domain corresponding to a calendar, with the specific intent of scheduling a meeting. But scheduling a meeting requires other information, such as who is involved in the meeting, and the start and stop times of the meeting. For convenience in exposition, it will be assumed that identifying an intent also includes identifying any required additional information necessary to carry out the request corresponding to the intent.

The arbitration module 214 (which may be seen as implementing some or all of the arbitration system 114 of FIG. 1) is operable to take as input a domain and/or intent, and determine which among several personal assistants is best suited to handle a request invoked by the domain and/or intent. The arbitration module 214 may perform this functionality with reference to the user profile data 226, the personal assistant data 228, and other data. In some examples, the arbitration module 214 accomplishes this by the procedure 300 described below in reference to FIG. 3.

The personal assistant data 228 includes which of the (possibly several) available personal assistants the user employs. The personal assistant data 228 may also include a description of each personal assistant's capabilities. This description may include a list, hierarchy, or other description of available domains and/or intents that each personal assistant is capable of handling.

The user profile data 226 may include behavioral data. The behavioral data may include a history of previous commands (or types of commands) issued by the user to the platform 200, along with contextual data surrounding those commands. The contextual data may include the time of day at which a given command was issued, a location from which it was issued, one or more activities in which the user was engaged in when issuing the command (e.g., driving, walking, listening to music, speaking on the phone to a particular person, etc.), what event(s) are on the user's calendar within a certain time of the command, the extent weather conditions when the user issued the command, etc. As explained more fully below, the behavioral data contained in the user profile data 226, along with the personal assistant data 228, may be used by the arbitration module 214 in identifying a personal assistant.

The platform 200 is in data communication with instances of the user's various personal assistants 212. After the arbitration module 214 determines which of the various personal assistants 212 is appropriate to handle a given request, the platform 200 may route that request to that personal assistant.

The text-to-speech module 224 is operable to determine an audio signal corresponding to speaking specified words or phrases. This can be used to formulate audio prompts or messages to send to the user, e.g. via the loudspeaker 210. For example, in some examples the platform 200 may confirm with the user that a particular command was successfully executed. In another example, the platform 200 may need more input from the user to resolve an ambiguity. In this example, a prompt may be spoken to the user via the text-to-speech module 224 and the loudspeaker 210. In some examples, the text-to-speech module 224 may include the NUANCE VOCALIZER engine.

Although the various components of platform 200 are shown and described as a single unit, in practice at least some of the functionality described above may be implemented on hardware that is remotely located from other hardware components of the platform 200. The components described above are in data communication with each other, but this data communication may be implemented locally (e.g., two or more components executing on the same hardware), or implemented remotely. In some examples, the data communication may be implemented by wireless signals (e.g., signals conforming to WiFi, WiMax, 3G/4G/5G, or other wireless communication protocols) transmitted and received via one or more antennae (not shown). The platform 200 may also be in data communication with other remote resources, e.g. a GPS receiver, an online weather service, etc.

Figure 3:
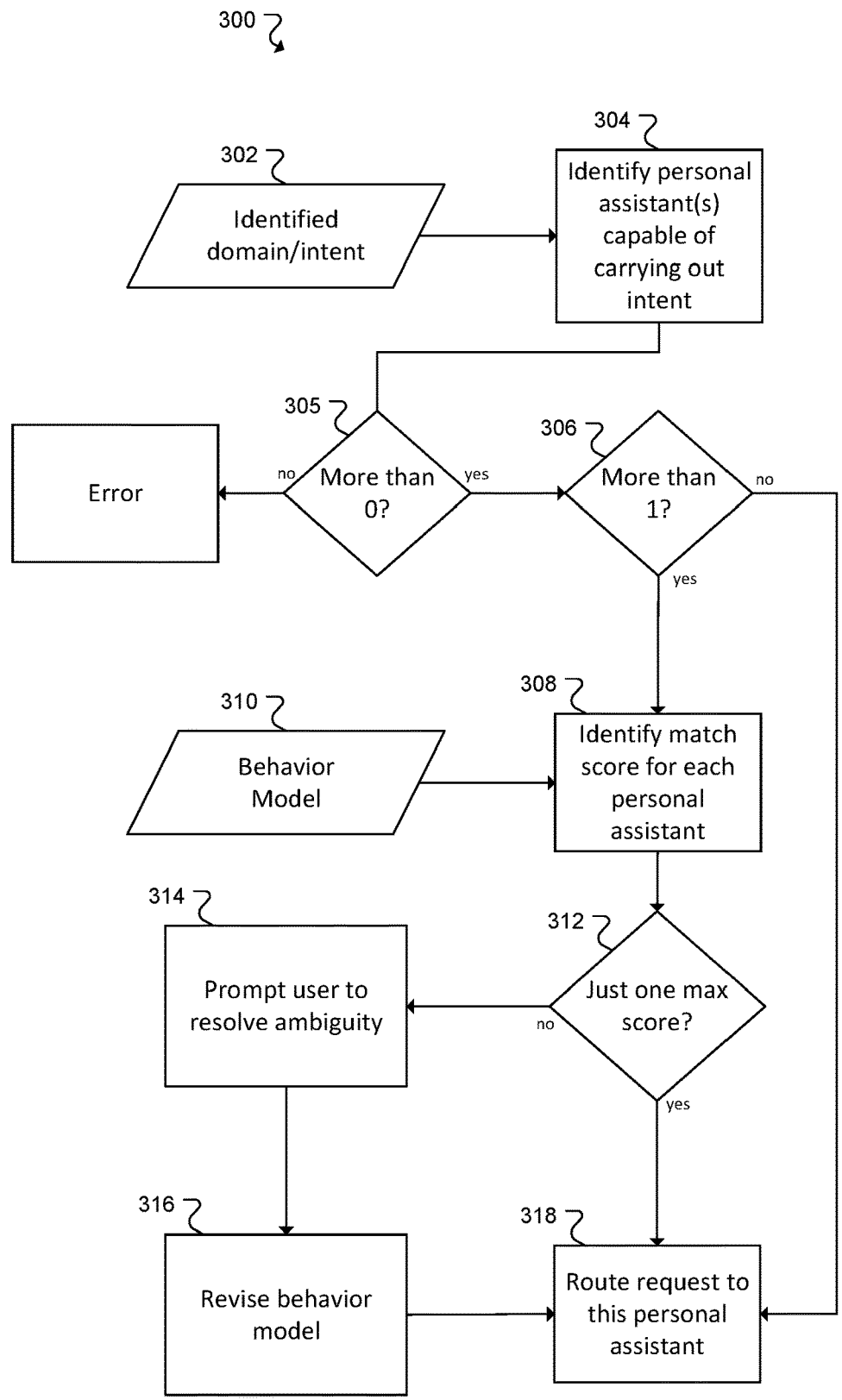
FIG. 3 is flowchart showing a personal assistant arbitration procedure.

FIG. 3 is flowchart showing a personal assistant arbitration procedure. The procedure 300 takes as input a serving domain and an intent. In some examples, the serving domain and intent 302 are identified by the platform 200, and more specifically by the language processor 222. In step 304, a list of candidate personal assistants is identified. A personal assistant is identified in step 304 as a candidate if that personal assistant has functionality that is capable of carrying out the request that invoked the identified domain and intent. For example, the utterance "open the sunroof" may give rise to an intent corresponding to activating a sunroof a vehicle to open it. It may be that some personal assistants available to the user are not even theoretically capable of activating an sunroof of a vehicle, and therefore those personal assistants would not be identified as candidates in step 304.

If no candidate personal assistants are identified (decision 305), then an error message is given to the user. If exactly one candidate personal assistant is identified (decision 306), then the request is routed to that personal assistant. For example, this can occur explicitly; e.g., if the user utters the wake word or a unique name for that personal assistant. It can also occur implicitly; e.g., if only one personal assistant is capable of carrying out the request of the user. However, if more than one candidate personal assistant is identified (decision 306), then each candidate personal assistant is given a score (step 308), reflecting the likelihood that this particular personal assistant is the best candidate to carry out the user's request. This match score can be identified with reference to a behavior model 310.

The behavior model 310 can be based on a set of interactions between users and a platform (e.g., platform 200) attempting to arbitrate personal assistant requests. The behavior model 310 can include an artificial neural network, a support vector machine, a decision tree, a genetic algorithm, a Bayesian network, or any other appropriate machine learning model. In some examples, the behavior model 310 is included in the user profile data 226. In some examples, the user profile data 226, and specifically the user behavior data, is incorporated into the behavior model 310. In some examples, the behavior model 310 is initialized in an untrained state; i.e., a state in which any candidate personal assistant has an equal score for carrying out a particular request. In some examples, the behavior model 310 is initialized in a trained state, based on preliminary training data obtained by an OEM or operator of the platform 200.

In some examples, the behavior model 310 is manually configured to exclude certain dangerous or nonsensical outcomes. For example, a user may use a vehicle-oriented personal assistant ("PA1"), and a home-oriented personal assistant ("PA2"). Furthermore, both the user's vehicle doors and home front door may be opened by issuing the appropriate personal assistant a request to "open the door." However, if the user is currently in the vehicle, traveling at a high speed along a highway, the behavior model 310 may provide a match score of 0 to PA1 at that moment. Once the vehicle is stopped at a safe location, the behavior model 310 may provide a greater score for that request.

Another category of nonsensical behaviors are requests that would result in no action. For example, suppose the user again has a vehicle-oriented personal assistant ("PA1") and a home-oriented personal assistant ("PA2"), and suppose that each personal assistant is capable of controlling the temperature in the user's vehicle and home, respectively. Suppose the user is currently in the vehicle, the temperature is 73 degrees, and the user utters the request "set temperature to 73 degrees." Although both PA1 and PA2 are capable of acting on that request, routing it to PA1 is nonsensical in this context, because doing so would result in no action. Thus, the behavior model 310 may reduce the match score of PA1 in this context.

In another category of examples, the behavior model 310 may use the user's location to adjust the match scores of various assistants. For example, a user may live in a home having a smart garage door controlled by a first personal assistant, and may visit their parents who have a smart garage door controlled by a second personal assistant. A request to "open the garage door" may be given a higher score for one or the other personal assistant, based on the location of the user at the time the request was received.

These examples are non-exhaustive. In general, the behavior model can incorporate any patterns identifiable through previous behavior (whether behavior of the user or behavior of others), contextual factors, or other patterns.

After using the behavior model 310 to identify a match score for the various candidate personal assistants, procedure 300 continues by determining whether there is a candidate personal assistant with a maximum match score (decision 312). In some examples, the maximum may be required to exceed the next highest match score by a threshold amount or percentage.

If there is more than one candidate personal assistant having the same (or approximately the same, within a desired threshold) match score, then the user is prompted to resolve the ambiguity (314). Continuing a previous example, if the user's musical library accessible to one personal assistant ("PA1") included works by Mozart, and another one of the user's personal assistants ("PA2") included a conversational game called "Mozart," then the procedure 300 may assign similar match scores to the respective personal assistants. In this case, the procedure 300 may ask the user, "Did you mean 'play Mozart' on PA1 or 'play Mozart' on PA2?"

Based on the user input, the behavior model 310 may be revised to incorporate this behavior (step 316), and the request is passed to the specified personal assistant (step 318).

On the other hand, if in decision 312 there was a personal assistant that had a maximum match score, then the procedure 300 proceeds directly to routing the request to that personal assistant.

4 Alternatives

Many configurations of the system described above are possible. For example, the arbitration system 114 may be integrated into the native voice assistant 113 or the native voice assistant may be integrated into the arbitration system 114.

Some or all of the system may be implemented entirely in the vehicle, entirely in the cloud or partially in the vehicle and partially in the cloud.

The system described is generally scalable, especially in the sense that it is updatable to operate with new third-party voice assistants, as they become available.

In general, the audio system of the vehicle is fully accessible to the user when the arbitration system and/or the native voice assistant are in a listening mode.

In some examples, information related to the user's interactions with the various voice assistants are stored for future use.

In some examples, the third-party voice assistants are configured to collaborate with the arbitration system and/or the native voice assistant to manage user interactions. Some of these interactions may be used to personalize and/or streamline future interactions.

In some examples, the voice assistants communicate with the arbitration system using, for example, simulated audio interfaces or simulated push-to-talk buttons. For example, a Bluetooth audio connection could be used to provide data (e.g., audio data) to a cell-phone based voice assistant present in the vehicle. A telephone or cellular data-based connection could be used to provide data (e.g., audio data) to a remotely located voice assistant (e.g., a voice assistant located at the user's home).

5 Implementations

The approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for managing interactions between users of an interface and a plurality of voice assistants associated with the interface, wherein the interface is part of a platform that is executing in a vehicle, wherein the plurality of voice assistants includes a first voice assistant, which is native to the vehicle, and one or more other voice assistants, which are associated with devices other than the vehicle, the method comprising:
   receiving a voice command from a user of the interface;
   determining a voice assistant of the plurality of voice assistants for servicing the voice command based at least in part on a context in which the voice command is issued, the context including a location of the vehicle relative to the devices, which are associated with the one or more other voice assistants;
   providing a representation of the voice command to the voice assistant for servicing; and
   monitoring an interaction between the voice assistant and the user during servicing of the voice command.

2. The method of claim 1, wherein the interaction between the voice assistant and the user is monitored by the interface.

3. The method of claim 1, wherein monitoring the interaction between the voice assistant and the user during servicing of the voice command includes determining when the voice assistant has finished servicing the voice command.

4. The method of claim 1, wherein monitoring the interaction between the voice assistant and the user during servicing of the voice command includes processing the interaction between the voice assistant and the user according to a user interaction model.

5. The method of claim 1, wherein determining the voice assistant for servicing the voice command includes processing the voice command according to a user interaction model.

6. The method of claim 1, wherein at least one voice assistant of the plurality of voice assistants is native to the interface and at least one voice assistant of the plurality of voice assistants is non-native to the interface.

7. The method of claim 1, wherein at least one voice assistant is associated with a smart phone or a smart speaker.

8. The method of claim 1, wherein the one or more other voice assistants execute entirely on devices other than the vehicle.

9. The method of claim 1, wherein the first voice assistant at least partially executes in the vehicle.

10. The method of claim 1, further comprising providing the voice command concurrently to the first voice assistant and to an arbitrator, wherein the arbitrator determines the voice assistant of the plurality of voice assistants for servicing the voice command.

11. The method of claim 1, wherein the first voice assistant is configured to effect changes to a configuration of the vehicle.

12. The method of claim 1, wherein determining the voice assistant for servicing the voice command includes identifying a voice assistant of the plurality of voice assistants that is most capable of servicing the voice command.

13. The method of claim 1, wherein determining the voice assistant for servicing the voice command is based on a pattern of the user's prior behavior.

14. The method of claim 1, wherein determining the voice assistant for servicing the voice command includes querying the user to disambiguate between two or more of the voice assistants.

15. A system for managing interactions between users of an interface that is part of a platform that is executing in a vehicle and a plurality of voice assistants that are associated with the interface, the plurality of voice assistants including a first voice assistant, which is native to the vehicle, and one or more other voice assistants, which are associated with devices other than the vehicle, the system comprising:

an input for receiving a voice command from a user of the interface;

an arbitration module for determining a voice assistant of the plurality of voice assistants for servicing the voice command based at least in part on a context in which the voice command is issued, the context include a location of the vehicle relative to the devices, wherein are associated with the one or more other voice assistants; and an output for providing a representation of the voice command to the voice assistant for servicing; and a monitoring module for monitoring an interaction between the voice assistant and the user during servicing of the voice command.

16. The system of claim 15, wherein the monitoring module is configured to determine when the voice assistant has finished servicing the voice command.

17. The system of claim 15, wherein the monitoring module is configured to process the interaction between the voice assistant and the user according to a user interaction model.

18. The system of claim 15, wherein the arbitration module is configured to determine the voice assistant at least in part by using at least one of a user interaction model and a pattern of the user's prior behavior.

19. The system of claim 15, wherein the arbitration module is configured to determine the voice assistant by querying the user to disambiguate between two or more of the voice assistants.

20. The system of claim 15, wherein the arbitration module is configured to determine the voice assistant by identifying that voice assistant that is most capable of servicing the voice command.

* * * * *